(12) United States Patent
Grosvenor

(10) Patent No.: US 7,999,855 B2
(45) Date of Patent: Aug. 16, 2011

(54) IMAGE CAPTURE DEVICE HAVING MOTION SENSING MEANS

(75) Inventor: David Arthur Grosvenor, Frampton Cotterell (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1744 days.

(21) Appl. No.: 11/220,338

(22) Filed: Sep. 6, 2005

(65) Prior Publication Data
US 2006/0050982 A1    Mar. 9, 2006

(30) Foreign Application Priority Data

Sep. 8, 2004 (GB) .................................... 0419863.6

(51) Int. Cl.
*H04N 5/228* (2006.01)
(52) U.S. Cl. .................................................. 348/208.12
(58) Field of Classification Search ............... 348/208.3, 348/231.6, 208.6, 211.6, 208.16, 208.12
See application file for complete search history.

(56) References Cited

U.S. PATENT DOCUMENTS

| | | | | | |
|---|---|---|---|---|---|
| 4,945,367 | A | * | 7/1990 | Blackshear | 396/427 |
| 5,479,203 | A | * | 12/1995 | Kawai et al. | 348/14.1 |
| 5,764,291 | A | * | 6/1998 | Fullam | 348/362 |
| 6,721,013 | B1 | * | 4/2004 | Tsujino | 348/345 |
| 2004/0085464 | A1 | * | 5/2004 | Higurashi et al. | 348/241 |
| 2004/0125229 | A1 | | 7/2004 | Aoyama et al. | |
| 2005/0057662 | A1 | * | 3/2005 | Washisu | 348/208.99 |
| 2005/0212911 | A1 | * | 9/2005 | Marvit et al. | 348/154 |
| 2005/0264678 | A1 | * | 12/2005 | Butterworth | 348/345 |
| 2006/0256202 | A1 | * | 11/2006 | Hohenacker | 348/211.99 |

FOREIGN PATENT DOCUMENTS
JP        11355639        12/1999

* cited by examiner

Primary Examiner — Sinh Tran
Assistant Examiner — Jason A Flohre

(57) ABSTRACT

An image capture device (10) incorporates motion sensing means (12a/12b), a controller (16) and setting controls (14) for the image capture device (10), wherein the controller (16) is operable to store a plurality of configurations of the setting controls (14) as preset configurations, wherein each of said preset configurations is associated with a particular output of the motion sensing means (12a/12b).

18 Claims, 2 Drawing Sheets

IMAGE CAPTURE DEVICE HAVING MOTION SENSING MEANS

FIELD OF THE INVENTION

This invention relates to an image capture device having motion sensing means and to a method of capturing images based on motion sensed by an image capture device.

CLAIM TO PRIORITY

This application claims priority to copending United Kingdom utility application entitled "Image Capture Device Having Motion Sensing Means" having serial number GB0419863.6, filed 8 Sep. 2004, which is entirely incorporated herein by reference.

DESCRIPTION OF THE BACKGROUND ART

In situations where a user wishes to capture still or moving images at, for example, a sporting event, he is faced with frequent repeated changes of particular functions of the image capture device, such as zoom settings, focus to particular parts of a football pitch for example or a race track, together with exposure control and the like. It is also likely to be the case that the user will repeat the same group of camera settings as the sporting event progresses.

SUMMARY OF THE INVENTION

According to a first aspect of the invention an image capture device incorporates motion sensing means, a controller and parameter control for the image capture device, wherein the controller is operable to store a plurality of configurations of the parameter controls as preset configurations, wherein each of said preset configurations is associated with a particular output of the motion sensing means.

The output of the motion sensing means may be a spatial orientation of the image capture device, or may be a movement pattern of the image capture device.

The motion sensing means may comprise at least one motion sensor, preferably of an accelerometer type. The motion sensing means may be an image analysis device, preferably a computing device or microcomputer, operable to analyse images captured by the image capture device to detect movement of the image capture device.

The parameter controls are preferably operable to adjust and/or control one or more of a zoom setting, a focus setting, an exposure setting, a light balance setting, an image stabilisation setting and/or an image capture function.

Two or more preset configurations may be associated with substantially the same spatial orientation of the image capture device. In which case at least one of the parameter controls has a different setting between said two or more preset configurations. The image capture device is preferably operable in such a case to capture images in both or all of said preset configurations and select a preferred image according to a comparison. Said comparison may be a comparison of sharpness of the images.

The image capture device preferably incorporates a user interface operable to allow a user to set said preset configurations, preferably by selection of the setting controls whilst maintaining the image capture device in a given spatial orientation.

At least one of the preset configurations may be associated with a movement pattern of the image capture device detected by the motion sensing means.

Preferably, said preset configuration includes control of a zoom feature based on detected motion, preferably by zooming out when a detected speed of movement of the image capture device exceeds a given upper limit. Said preset configuration may additionally or alternatively include zooming in when a detected speed of movement of the image capture device falls below a given lower limit. A determination of the upper and/or lower limits may be performed by the controller, preferably based on a image stabilisation parameter or image sharpness parameter determined by the image capture device.

Said preset configuration may have an associated image stabilisation setting for the detected movement pattern.

The image capture device may be portable, and/or wearable, and/or head mounted.

According to a second aspect of the invention a method of capturing images based on motion sensed by an image capture device comprises:
  storing a plurality of configurations of setting controls of
    an image capture device as preset configurations,
    wherein each preset configuration is associated with a
    particular output of motion sensing means of the image
    capture device; and
  capturing at least one image with the image capture device
    set at one of said preset configurations when an output of
    the motion sensing means is substantially the same as
    that associated with the preset configuration.

The motion sensing means may output a spatial location of the image capture device, which may include a direction in which the image sensing means is pointing. Alternatively or additionally, the motion sensing means may indicate a pattern or movement characteristic of the image capture device.

One of said preset configurations may include zooming a lens of the image capture device out when a detected movement characteristic exceeds a given threshold, such as a threshold of acceptable image stabilisation determined by the image capture device. Alternatively or additionally one of the preset configurations may involve zooming in when a detected movement characteristic is less than a given threshold.

The method may include the user directing the image capture device at a particular scene, or in a particular direction, and setting one or more of the preset configurations, preferably by adjusting one or more of a focus setting, a zoom setting, an exposure setting, a light balance setting, an image stabilisation setting and/or an image capture function.

The method may include automatic image capture when the image capture device is pointed substantially in the direction associated with one or more of the preset configurations, based on motion/a position detected by the motion sensing means.

All of the features described herein may be combined with any of the above aspects, in any combination.

For a better understanding of the invention and to show how the same may be brought into effect, specific embodiments will now be described, by way of example, with reference to the accompanying drawings, in which:

DESCRIPTION OF THE PREFERRED EMBODIMENTS

Figure 1A:
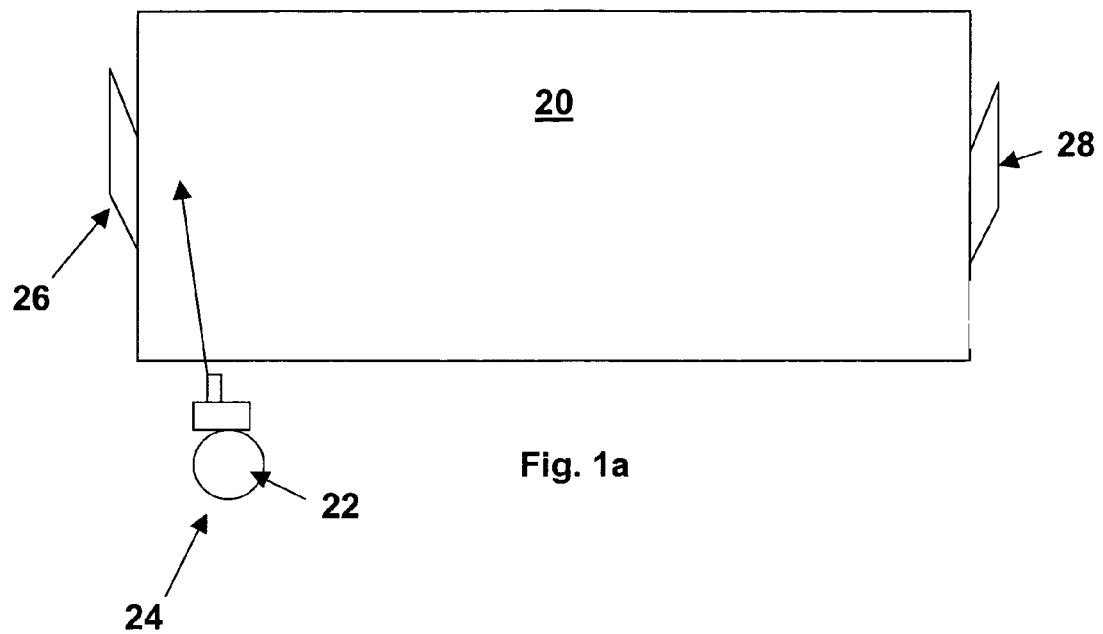
FIG. 1a is a schematic view from above of a user with an image capture device at a football match pointing the image capture device to a first end of a football pitch.

An image capture device 10 incorporates a lens 11 and standard controls 14, as is usual for a still image capture device or a video image capture device.

The controls 14 are operable in the usual way to control functions such as a zoom feature of the lens 11, light balance, focussing, image capture (for example by controlling a shutter), exposure control, image stabilisation and on/off functions.

The image capture device 10 also incorporates motion sensors 12a/12b, which are operable to detect side to side and up/down rotation of the image capture device 10. The motion sensors 12a/12b maybe miniature compass devices, such as a Hall effect type Honeywell HMR 3200, or may be mini-gyroscopic devices, such as a Murata ENC OJJ.

The image capture device 10 incorporates a controller 16, which is operable to control the various controls 14 for the image capture device. Also, the controller 16, which may be a micro computing device, stores a number of preset control criteria for the image capture device 10.

One of the preset control criteria involves the use of output from the motion sensors 12a/12b in conjunction with a zoom setting of the lens 11. The preset control criterion is used when the controller 16 determines that an acceptable image or a given zoom setting cannot be captured due to excessive motion which would result in blurring of an image. For a still image capture device 10, systems are well-known for indicating whether sufficient light is available for a given exposure. The preset control criterion here simply uses output from the motion sensors 12a/b to determine whether an image will be acceptably in focus. In this situation the controller 16 will reduce the zoom setting to give a wider angle image and thereby more easily capture a stable image. The zoom may be reduced by 5 mm (or an equivalent thereof) until an acceptable image is obtained by usual autofocussing methods, which may include maximisation of the gradient of the image to find the image with most edges, hence the most focus, by a search or optimisation technique.

The converse also applies and one of the preset criteria allows for the controller 16 to zoom in on a subject when only low levels of motion are detected by the motion sensors 12a/12b. An image stabilisation system such as that described in U.S. Pat. No. 6,112,028 could be used (as could many other examples) for video or still images. U.S. Pat. No. 5,479,203 describes limits to a speed of panning of a fixed location camera for a given zoom setting. Those limits are used here in reverse to set an acceptable level of zoom that still gives an acceptably good image based on detected speed of motion.

Image stabilisation techniques, as are well known in the art, particularly for video image capture, are used to assess the quality of an image. Where the image stabilisation techniques are unable to provide a suitably stable image, then the zoom function as outlined above, is engaged.

An additional feature of the image capture device 10 is to use the motion sensors 12a/12b to calculate a change in position and orientation of the image capture device 10. By analysing the motion sensor outputs with the controller 16 it is possible to determine when a user is pointing the image capture device at the same scene or a similar scene to one which the user has pointed the image capture device at previously. When the same view or a similar view has been detected by this method the controller 16 reverts to the settings which were made or adopted when the image capture device 10 was previously pointed at that given scene. The motion sensors 12a/b are used to detect, for example, a movement of 20° rotation to the left. When a 20° rotation to the right is detected, the controller 16 will determine that the image capture device 10 has returned to its original position. Similar calculations are made by the controller 16 for up/down rotations.

An addition to this feature is that a user may point his image capture device 10 at a particular scene and by pressing one of the controls 14 he may save the settings of focus, zoom, light level, exposure, motion stabilisation and the like for the particular direction in which he is pointing the image capture device 10. The user can repeat this by repeated setting of the controls 14 to provide a number of preset control criteria for different directions in which he is pointing the image capture device. When these preset control criteria have been set, output from the motion sensors 12a/12b is analysed by the controller 16 and the particular control criteria are adopted whenever the camera is pointed in that particular direction. The control criteria may include automatic image capture when the image capture device is pointed in that direction or close to that direction.

Figure 1B:
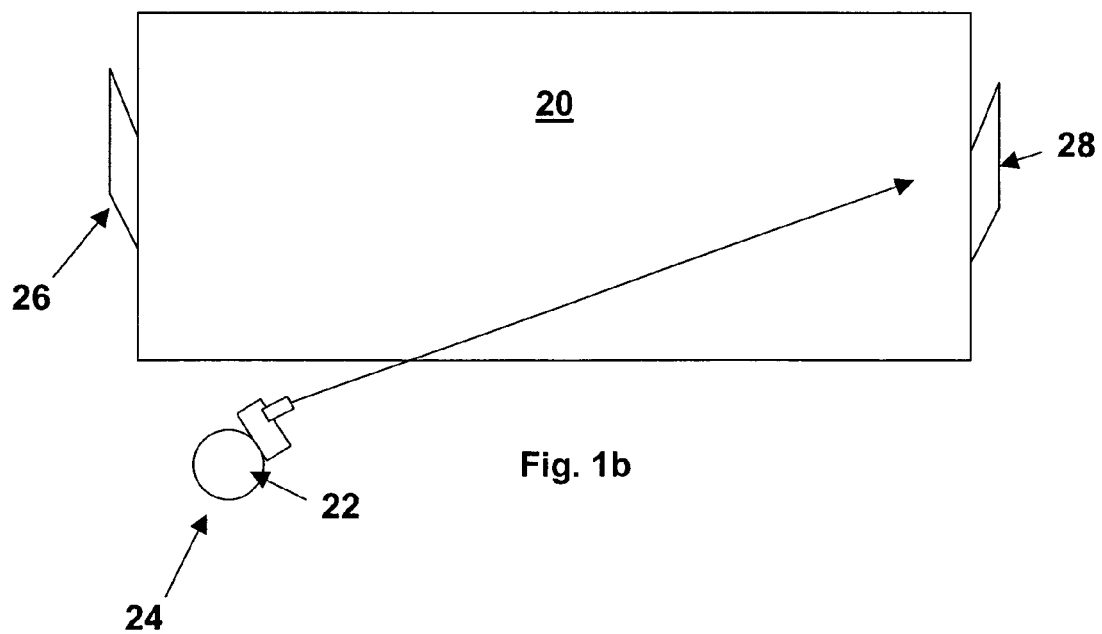
FIG. 1b is a similar view of the user and football pitch shown in FIG. 1a pointing the image capture device to an opposite end of the football pitch.

This feature has particular application, for example, when a user is watching a football or rugby match from a given location at a stadium. The situation is shown schematically in FIGS. 1a, 1b, 2a and 2b. A football pitch 20 is viewed by the user 22 from a location 24 on terraces of the football stadium. In order to set the preset control criteria, the user points the image capture device 10 at a left hand goal 26 as shown in FIG. 1a, a right hand goal 28 as shown in FIG. 1b, and at locations in between, such as a centre line or an edge of a penalty area. These preset control criteria are saved by the controller 16 to give focus, zoom and light level settings, together with other suitable features if necessary.

When a user is watching the match he may move the image capture device, which movement is detected by the motion sensors 12a/12b and when the image capture device 10 is pointing in the same direction, or a similar direction (given some allowance for error) as one of the preset control criteria, then those control criteria are adopted by the image capture device 10. The user can then capture an image by pressing a shutter button or a commence recording button for a video capture device, whenever he sees a scene that he wishes to capture.

Figure 2A:
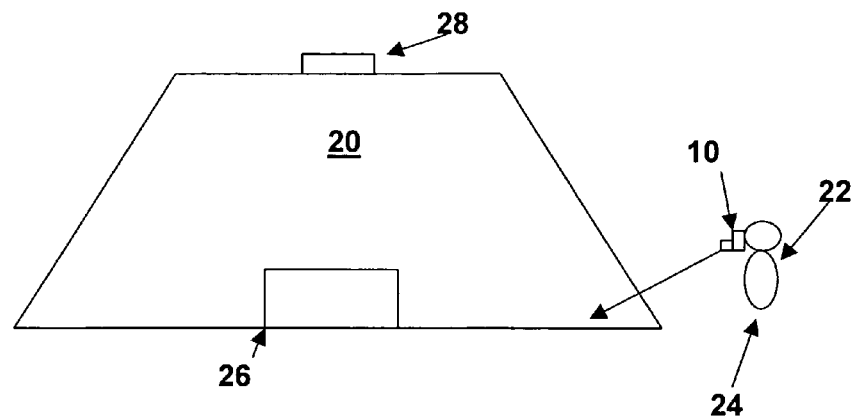
FIG. 2a is a schematic side view of one end of the football pitch showing a user in a terrace above the pitch pointing the image capture device to one side of the pitch.
Figure 2B:
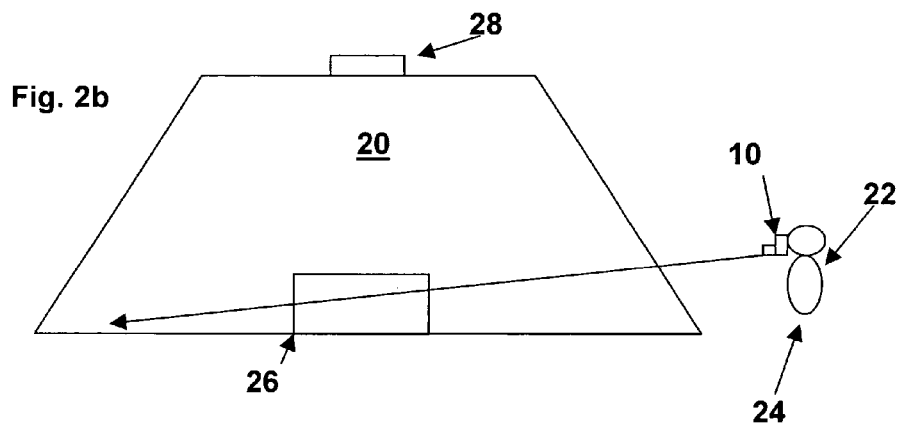
FIG. 2b is a view similar to that in FIG. 2a, except that the user is pointing his image capture device to an opposite side of the pitch.
Figure 3:
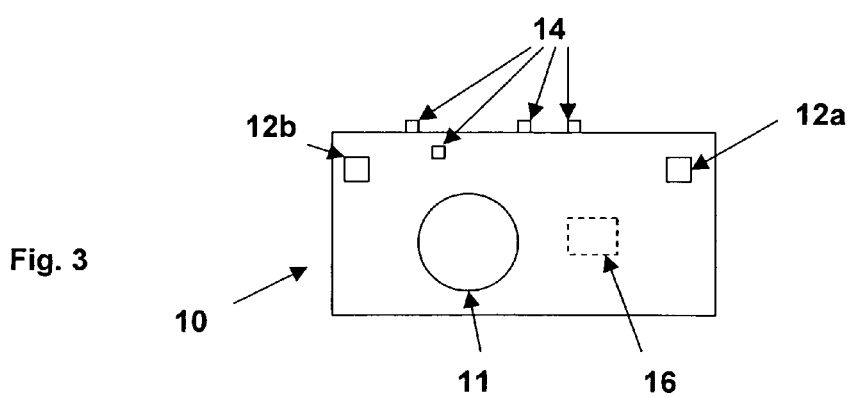
FIG. 3 is a schematic front view of the image capture device.

Referring to FIGS. 2a and 2b, the angle of up/down tilt may also be detected with the motion sensors 12a/12b to allow preset control criteria to be set for different parts of the football pitch 20 that are in the same line of view, but to which the user 22 applies some rotation in a vertical plane to the image capture device 10. These views will have different focus settings, because of their different distances from the user, although a left/right position will be no different for these preset control criteria. The user sets the preset control criteria for these positions in the same way as he does for those described above.

In an example where a user is on the same level as the football pitch 20 the up/down tilt of the image capture device 10 will not be changed between near and far sides of the football pitch 20. This may be accounted for by different focus settings which the user can set for the preset control criteria. When in use, the controller 16 will in this example have two preset control criteria for the same location of the image capture device. The preset control criteria would have different focus settings and may have different zoom settings. In this situation when in the location of these preset control criteria the image capture device 10 tries both of the preset control criteria and analyses resulting images for the best focus of objects within the images. Thus, if there is more subject matter of interest at a far side of the pitch, the focus is likely to be better at that side, because there may be more players which the user 22 wishes to capture with the image capture device 10. Thus, the preset control criteria focussed on the far side of the pitch would be used.

A further implementation for the preset control criteria described above is watching a cycle road race. When the user 22 arrives at a location where he will watch a cycle road race, he sets a number of the preset control criteria for locations at which he may wish to photograph cyclists. This will typically be as the cyclists pass him on a road. Thus, different preset control criteria will have different focus and exposure settings dependent upon the location at which he wishes to capture an image of the cyclist. Also, different zoom criteria may be applied. The different preset control criteria are associated with a particular position of the image capture device detected by the motion sensors 12a/12b. In the situation where cyclists are coming directly towards a user, different focus settings may be the only difference between different preset control criteria, except for perhaps zoom settings, for a given image capture device 10 position. When a situation of this type arises there will be no difference between the position of the image capture device detected by the motion sensors 12a/12b. In order to capture the best image, the image capture device 10 may take images at all settings having the same position, or may consider the images from using the controller 16 to assess a quality of focus in the images.

An extension of the use of the motion sensors 12a/12b to determine a direction in which the image capture device 10 is pointing is to use particular types of detected movements for particular preset control criteria, such as when the user 22 follows passes of a football across a football pitch 20. Such movements may have associated preset control criteria associated with a particular position, which may be a transition between static preset control criteria, such as those discussed above. These criteria may have particular image stabilisation settings and zoom settings to account for movement of the image capture device 10. For example, greater or stronger image stabilisation can be used. The feature discussed above whereby the lens 11 zooms out whilst moving is also relevant to these preset control criteria for detected types of movement from a first location to a second location.

Also detected movement of the image capture device 10 is used to move between preset control criteria. Thus, as one preset becomes blurred or otherwise unacceptable as the image capture device 10 is moved, the controller 16 selects a different preset control criterion for the location to which the image capture device is being moved.

An alternative embodiment of image capture device does not make use of the motion sensor 12a/12b described in relation to the first embodiment. Instead, the controller 16 analyses images received via the lens 11 to determine movement of the image capture device 10. This may be implemented by analysing identified subjects in the images as they move across an image field to indicate movement of the image capture device 10. This technique has been described in "Comparing and Evaluating Interest Point"; Cornelia Schmid, Roger Mohr, Christian Buckhard, Proc. International Conference on Computer Vision, 1998, pp 230-235, Narosa Publishing House.

The image capture device 10 may be a (digital) still camera or a video camera, which may be head mounted.

The embodiments described above have significant advantages over the prior art in that preset control criteria of an image capture device are triggered by detecting a direction in which the image capture device is pointing, or in which it is moving, using motion sensors or image analysis techniques.

In addition, the feature of an image capture device retaining settings of the controls 14 of the image capture device from when the image capture device was previously pointed in a given direction has advantages in terms of consistency of image capture and also a reduction in a time which it takes to make adjustment to the controls 14 of the camera.

What is claimed is:

1. An image capture device, comprising:
    a motion sensor system operable to produce an output in response to motion of the image capture device:
    a controller;
    setting controls for configuring different functions of the image capture device; and
    a user interface for generating preset configurations of the setting controls in response to user input associating specified ones of the image capture device functions with respective outputs of the motion sensor system, wherein the preset configurations comprise respective parameter control settings that configure active operation of respective ones of the image capture device functions in association with the respective outputs of the motion sensor system;
    wherein the controller is operable to store the preset configurations of the setting controls and is operable to configure active operation of respective ones of the image capture device functions in accordance with the stored preset configurations based on outputs of the motion sensor system.

2. An image capture device as claimed in claim 1, wherein the output of the motion sensor system is a spatial orientation of the image capture device or a movement pattern of the image capture device.

3. An image capture device as claimed in claim 1, wherein the motion sensor system is an image analysis device operable to analyse images captured by the image capture device to detect movements of the image capture device.

4. An image capture device as claimed in claim 1, wherein the setting controls are operable to respectively control multiple of a zoom setting, a focus setting, an exposure setting, a light balance setting, an image stabilisation setting, and an image capture function.

5. An image capture device as claimed in claim 1, wherein two or more of the preset configurations are associated with substantially the same spatial orientation of the image capture device.

6. An image capture device as claimed in claim 5, wherein at least one of the setting controls has a different respective setting in each of two or more of the preset configurations.

7. An image capture device as claimed in claim 5, wherein the image capture device is operable to capture images with the image capture device functions configured in accordance with multiple of said preset configurations, and the controller is operable to select a preferred image from a set of images captured by the image capture device with the image capture device functions configured in accordance with different ones of the preset configurations based on a comparison of the captured images in the set.

8. An image capture device as claimed in claim 1, wherein the user interface is operable to allow a user to set said preset configurations by selection of the setting controls whilst maintaining the image capture device in respective spatial orientations.

9. An image capture device as claimed in claim 1, wherein at least one of the preset configurations is associated with a movement pattern of the image capture device detected by the motion sensor system.

10. An image capture device as claimed in claim 9, wherein said at least one preset configuration includes control of a zoom feature based on the output of the motion sensor system.

11. An image capture device as claimed in claim 10, wherein said at least one preset configuration includes control of said zoom feature by zooming out when a detected speed of movement of the image capture exceeds a given upper limit.

12. An image capture device as claimed in claim 9, wherein said at least one preset configuration has an associated image stabilisation setting for the detected movement pattern.

13. An image capture device as claimed in claim 1, wherein the image capture device is portable, wearable, or head mounted.

14. A method of capturing images based on motion sensed by an image capture device, the method comprising:
producing outputs in response to motion of the image capture device;
generating preset configurations of setting controls for configuring different functions of the image capture device in response to user input associating specified ones of the image capture device functions with respective ones of the outputs, wherein the preset configurations comprise respective parameter control settings that configure active operation of respective ones of the image capture device functions in association with the respective outputs;
storing the preset configurations of setting controls;
configuring active operation of respective ones of the functions of the image capture device in accordance with the stored preset configurations based on respective ones of the outputs; and
capturing at least one image with one or more of the image capture device functions configured in accordance with a selected one of said preset configurations when a respective one of the outputs is determined to match a respective one of the outputs associated with the selected preset configuration.

15. A method as claimed in claim 14, wherein one of said preset configurations includes zooming a lens of the image capture device out when a detected movement characteristic exceeds a given threshold.

16. A method as claimed in claim 14, further comprising the user directing the image capture device at a particular scene, or in a particular direction, and setting one or more of the preset configurations.

17. A method as claimed in claim 14, further comprising automatic image capture when the image capture device is pointed substantially in the direction associated with one or more of the preset configurations, based on motion/a position detected by the motion sensor system.

18. An image capture device, comprising:
an image capture section;
at least one motion sensor system operable to produce an output in response to motion of the image capture device
a controller;
setting controls for configuring different functions of the image capture device; and
a user interface for generating preset configurations of the setting controls in response to user input associating specified ones of the image capture device functions with respective outputs of the motion sensor system, wherein the preset configurations comprise respective parameter control settings that configure active operation of respective ones of the image capture device functions in association with the respective outputs of the motion sensor system;
wherein the controller is operable to store the preset configurations of the setting controls and is operable to configure active operation of respective ones of the image capture device functions in accordance with the stored preset configurations based on outputs of the motion sensor system, the output of the motion sensor system is a spatial orientation of the image capture device or a movement pattern of the image capture device, and the setting controls are operable to respectively control multiple of a zoom setting, a focus setting, an exposure setting, a light balance setting, an image stabilisation setting, and an image capture function of the image capture section.

* * * * *

UNITED STATES PATENT AND TRADEMARK OFFICE
CERTIFICATE OF CORRECTION

| | | |
|---|---|---|
| PATENT NO. | : 7,999,855 B2 | Page 1 of 1 |
| APPLICATION NO. | : 11/220338 | |
| DATED | : August 16, 2011 | |
| INVENTOR(S) | : David Arthur Grosvenor | |

It is certified that error appears in the above-identified patent and that said Letters Patent is hereby corrected as shown below:

In column 6, line 20, in Claim 1, delete "device:" and insert -- device; --, therefor.

Signed and Sealed this
Tenth Day of April, 2012

David J. Kappos
*Director of the United States Patent and Trademark Office*